(12) United States Patent
Korte et al.

(10) Patent No.: US 10,137,869 B2
(45) Date of Patent: Nov. 27, 2018

(54) AUTOMATIC BRAKE HOLD WITH LOW SPEED MANEUVERABILITY

(71) Applicant: FORD GLOBAL TECHNOLOGIES, LLC, Dearborn, MI (US)

(72) Inventors: Chad M. Korte, Grosse Ile, MI (US); Mike J. Mould, Leverkusen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/860,922

(22) Filed: Jan. 3, 2018

(65) Prior Publication Data

US 2018/0126964 A1 May 10, 2018

Related U.S. Application Data

(62) Division of application No. 14/527,949, filed on Oct. 30, 2014, now Pat. No. 9,896,071.

(51) Int. Cl.
*B60T 7/12* (2006.01)
*B60T 7/04* (2006.01)
*B60T 13/66* (2006.01)

(52) U.S. Cl.
CPC .............. *B60T 7/12* (2013.01); *B60T 7/042* (2013.01); *B60T 13/662* (2013.01); *B60T 2201/06* (2013.01); *B60T 2230/08* (2013.01)

(58) Field of Classification Search
None
See application file for complete search history.

(56) References Cited

U.S. PATENT DOCUMENTS

| | | | | |
|---|---|---|---|---|
| 2,251,787 A | * | 8/1941 | Gardiner | B60T 11/105 188/DIG. 2 |
| 2,381,755 A | * | 8/1945 | Jameson | B60T 7/12 192/219.4 |
| 2,414,409 A | * | 1/1947 | Goepfrich | B60T 11/103 137/44 |

(Continued)

FOREIGN PATENT DOCUMENTS

| | | | | |
|---|---|---|---|---|
| GB | 2311345 A | | 9/1997 | |
| JP | 2012162146 A | * | 8/2012 | ............. B60T 7/042 |
| WO | 2012038365 A1 | | 3/2012 | |

OTHER PUBLICATIONS

Owners Manual, 2015 Kia Cadenza, pp. 5-19 to 5-26, 2014.

*Primary Examiner* — Shelley Chen
(74) *Attorney, Agent, or Firm* — Frank A. MacKenzie

(57) ABSTRACT

A transportation vehicle has an autohold selector, such as a push button switch or other human-machine interface (HMI). A gear selector in the vehicle includes forward and reverse gear positions. A brake pedal can be depressed by a driver to actuate a brake actuator when slowing or stopping the vehicle. A control circuit is configured to initiate a brake hold event of the brake actuator in response to predetermined conditions including the autohold selector being on and the vehicle braking to a stop with the brake pedal depressed, wherein initiating the brake hold event is prevented if the gear selector is in the reverse position. If a brake hold event is in progress, then shifting the gear selector to reverse terminates the brake hold event. Low speed maneuvers, such as parking the vehicle, can be performed without a need for manually canceling the autohold feature.

6 Claims, 4 Drawing Sheets

(56) References Cited

U.S. PATENT DOCUMENTS

| | | | | |
|---|---|---|---|---|
| 3,008,349 | A | * | 11/1961 | Winchell ............. F16H 47/085 |
| | | | | 475/129 |
| 3,550,734 | A | | 12/1970 | Sinoda et al. |
| 4,497,395 | A | * | 2/1985 | Nogami .................... B60T 7/04 |
| | | | | 180/273 |
| 4,867,291 | A | * | 9/1989 | Holman ................. B60K 17/26 |
| | | | | 192/219.3 |
| 4,879,925 | A | * | 11/1989 | Taga ....................... B60T 7/122 |
| | | | | 192/219.1 |
| 5,415,467 | A | | 5/1995 | Utz et al. |
| 5,906,559 | A | * | 5/1999 | Murasugi ................ F16H 61/20 |
| | | | | 477/114 |
| 5,911,646 | A | * | 6/1999 | Tsutsui .................... B60T 7/122 |
| | | | | 192/13 A |
| 6,019,436 | A | | 2/2000 | Siepker |
| 7,401,872 | B2 | | 7/2008 | Kinder et al. |
| 7,641,291 | B2 | | 1/2010 | Streit et al. |
| 9,037,377 | B2 | | 5/2015 | Higa et al. |
| 9,381,922 | B2 | * | 7/2016 | Wysietzki ............. B60W 40/10 |
| 2003/0186779 | A1 | * | 10/2003 | Mori ....................... F16H 61/20 |
| | | | | 477/92 |
| 2004/0226768 | A1 | | 11/2004 | DeLuca et al. |
| 2012/0203433 | A1 | * | 8/2012 | Higa ....................... B60T 7/042 |
| | | | | 701/50 |
| 2012/0220424 | A1 | * | 8/2012 | Staudinger ............ B60W 30/16 |
| | | | | 477/80 |
| 2012/0228080 | A1 | * | 9/2012 | Fitzgerald ............... F16D 41/02 |
| | | | | 192/219.2 |
| 2014/0214252 | A1 | * | 7/2014 | Koike .................... B60Q 5/008 |
| | | | | 701/22 |
| 2016/0167663 | A1 | * | 6/2016 | Sutton ................ B60K 17/3467 |
| | | | | 701/54 |

\* cited by examiner

AUTOMATIC BRAKE HOLD WITH LOW SPEED MANEUVERABILITY

CROSS REFERENCE TO RELATED APPLICATIONS

This is a divisional application of co-pending U.S. application Ser. No. 14/527,949, filed Oct. 30, 2014, which is incorporated herein by reference.

STATEMENT REGARDING FEDERALLY SPONSORED RESEARCH

Not Applicable.

BACKGROUND OF THE INVENTION

The present invention relates in general to an automatic brake hold wherein application of the brakes can be maintained automatically after a vehicle operator brakes the vehicle to a stop, and, more specifically, to an automatic brake hold system without interference with low speed maneuverability.

An automatic braking feature for motor vehicles has been introduced known by the terms automatic vehicle hold (AVH), automatic brake hold, or brake autohold. A driver-controlled switch determines whether the feature is active. When active, a controller monitors vehicle movement. When the vehicle brakes to a stop (with the feature active) and the driver releases the brake pedal, brake pressure is automatically held to keep the vehicle at a stop. When the driver takes action to resume motion (e.g., pressing the accelerator pedal), the brake torque is released so that full control is restored to the driver. Driver fatigue is reduced since the need for continued pressure on the brake pedal during a long stop is eliminated.

During parallel parking and other low-speed maneuvers, a driver may take advantage of the creep of the vehicle that occurs when an automatic transmission vehicle is in gear and the brake is released without requiring any activation of the accelerator pedal (i.e., at idle). For example, the vehicle may move back and forth repeatedly to complete a parallel parking maneuver. When changing direction, a low-speed creep using only the brake pedal may be preferable to using the accelerator pedal in order to move the vehicle a short distance. An operator switch is provided which allows the driver to cancel the brake autohold function any time that it interferes with the low-speed maneuver. However, it would be desirable to automatically control the brake autohold feature in a way that avoids interfering with these low-speed maneuvers without requiring driver intervention.

SUMMARY OF THE INVENTION

In one aspect of the invention, a transportation vehicle is provided with an autohold selector, such as a push button switch or other human-machine interface (HMI). A gear selector in the vehicle includes forward and reverse gear positions. A brake pedal can be depressed by a driver to actuate a brake actuator when slowing or stopping the vehicle. A control circuit is configured to initiate a brake hold event of the brake actuator in response to predetermined conditions including the autohold selector being on and the vehicle braking to a stop with the brake pedal depressed, wherein initiating the brake hold event is prevented if the gear selector is in the reverse position. If a brake hold event is in progress, then shifting the gear selector to reverse terminates the brake hold event.

DETAILED DESCRIPTION OF PREFERRED EMBODIMENTS

Figure 1:
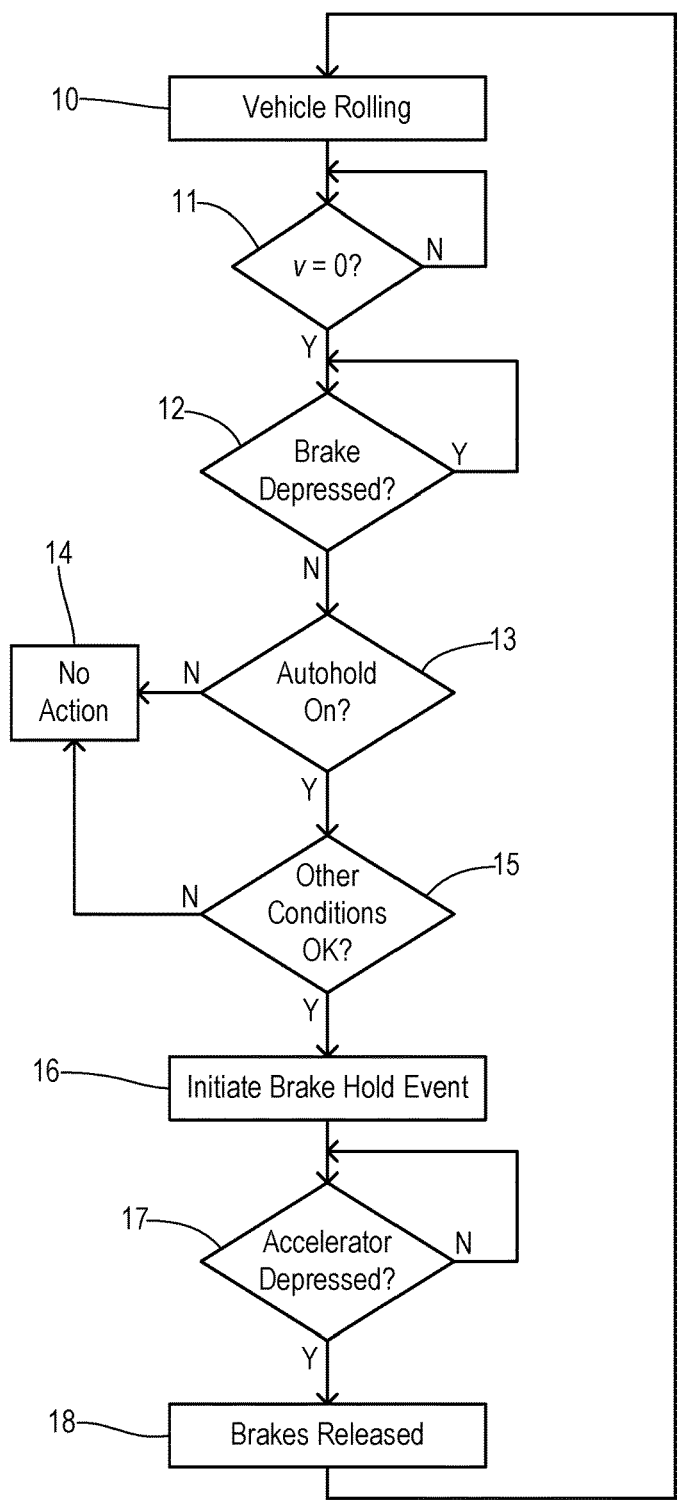
FIG. 1 is a flowchart showing a prior art method for implementing a brake autohold feature.

Referring now to FIG. 1, a conventional automatic brake hold method is shown wherein the vehicle is in a rolling condition (i.e., moving) at step 10. In step 11, a check is periodically to determine whether a vehicle velocity v has dropped to zero. When velocity v drops to zero then a check is performed in step 12 to determine whether the brake pedal is depressed by the driver (i.e., the autohold feature does not initiate while the driver maintains the brake pressure manually). When the driver releases the brake pedal, then check is performed in step 13 to determine whether the autohold feature is enabled. If it is not, then no action is taken and the process ends in step 14.

If the autohold feature is active in step 13, then other conditions are checked in step 15 to ensure that an autohold event can be safely initiated. The other conditions may include requirements that the driver's seat belt is fastened, the driver's door is closed, and the engine hood and trunk are closed, for example. If these conditions are not okay, then no action is taken at step 14. If the other conditions in step 15 are okay, then a brake hold event is initiated in step 16 wherein hydraulic or electronic means are engaged to maintain the brake pressure even though the driver is no longer depressing the brake pedal.

When the driver is ready to continue movement of the vehicle, the accelerator pedal would be pressed. In step 17, a check is performed to determine whether the accelerator has been depressed. If it is, then the brakes are released and the brake autohold event ends in step 18. The vehicle begins rolling, and the method reverts to monitoring for v=0 in step 11.

Figure 2:
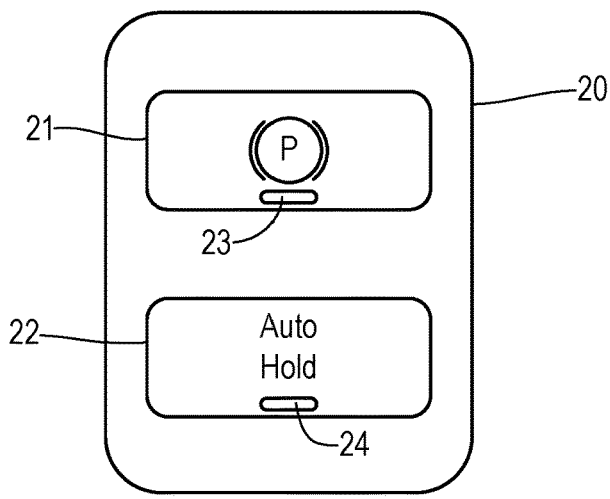
FIG. 2 is a plan view showing operator control switches for electric parking brake and brake autohold features.

FIG. 2 shows a set of operator controls 20 including an Electric Park Brake (EPB) switch 21 and an autohold switch 22, which may be pushbutton switches. Indicator lights 23 and 24 on switches 21 and 22 may be used to indicate the active/inactive state of each function. The EPB and autohold switches are preferably placed in close proximity on a vehicle control panel since the functioning of the two features may be closely related (e.g., autohold would be canceled whenever the EPB is turned on). When the autohold state is activated, indicator 24 may illuminate with different colors to inform the driver whether the autohold state is on (i.e., armed) and whether an actual autohold event is in progress (i.e., brakes being automatically applied), for example.

Figure 3:
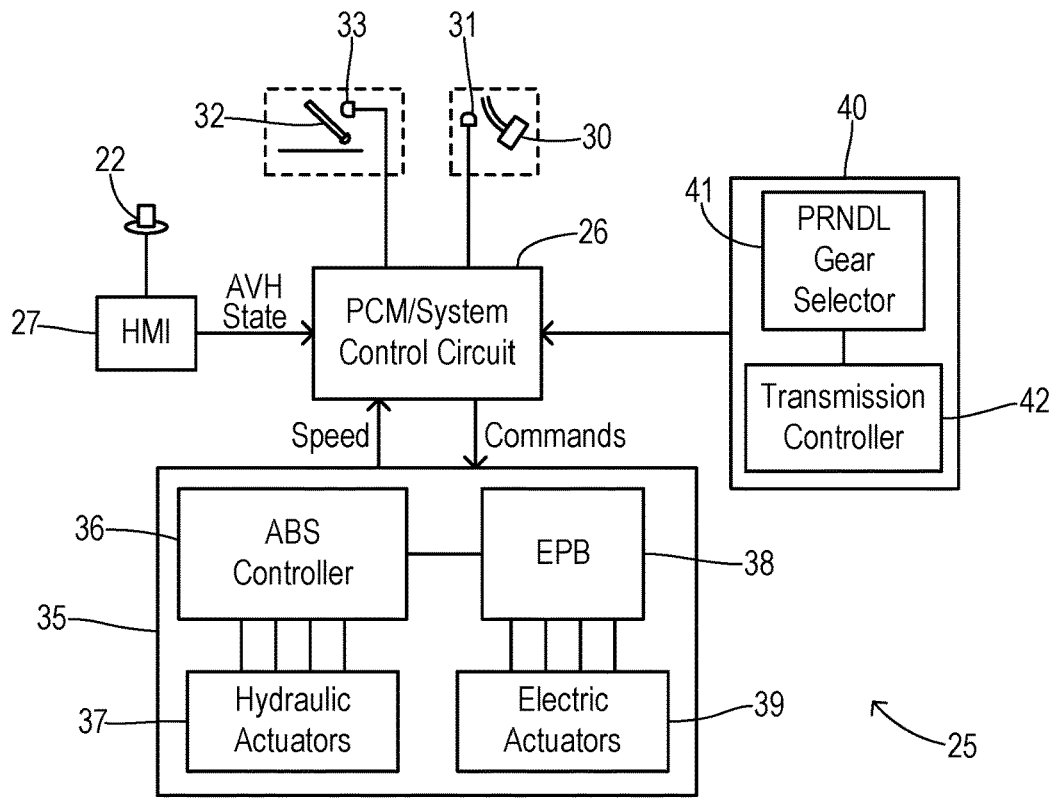
FIG. 3 is a block diagram showing a vehicle system according to one preferred embodiment of the invention.

FIG. 3 shows a vehicle system 25 of the present invention based on a control circuit 26 which may be included in a powertrain control module (PCM) or a main system controller module, for example. Control circuit 26 may be located within one module or distributed among several electronic modules within a vehicle. A human machine interface (HMI) 27 is coupled with autohold switch 22 to report the current status of an autohold state to control circuit 26. A brake pedal 30 has an associated brake position sensor 31 coupled to control circuit 26 for detecting when the brake pedal is being depressed. An accelerator pedal 32 has a position sensor 33 coupled to control circuit 26 for indicating when accelerator pedal 32 is being depressed.

A brake system 35 is coupled with control circuit 26 to receive various commands, including an autohold command to automatically provide brake pressure in a known manner. In this example, an anti-lock brake system (ABS) controller 36 is coupled to hydraulic actuators 37 for maintaining automatic hydraulic application of a brake torque to keep the vehicle at a standstill. Controller 36 may also be coupled to an EPB 38 with corresponding electric actuators 39 for electronically maintaining the brake pressure (e.g., if an autohold event extends over a longer period of time). Control circuit 26 may receive a vehicle speed signal v from ABS controller 37, or may monitor the vehicle speed using other sensors as known in the art.

A transmission system 40 includes a gear selector 41 and a transmission controller 42 as known in the art. Gear selector 41 may be comprised of a shift lever which is manually controlled between different positions including Park, Reverse, Neutral, and forward gear selections including Drive and Low. The corresponding position of gear selector 41 is provided from transmission system 40 to control circuit 26 for use in implementing the brake autohold function of the invention.

A main feature of the invention is the use of the transmission gear selector signal from transmission system 40 to deactivate or cancel the brake auto hold feature during low-speed maneuvers as indicated by use of the Reverse shift position. Thus, an autohold event is preferably prevented any time that the transmission is in Reverse and also for a predetermined interval after being shifted from Reverse into a forward or neutral gear position.

Figure 4:
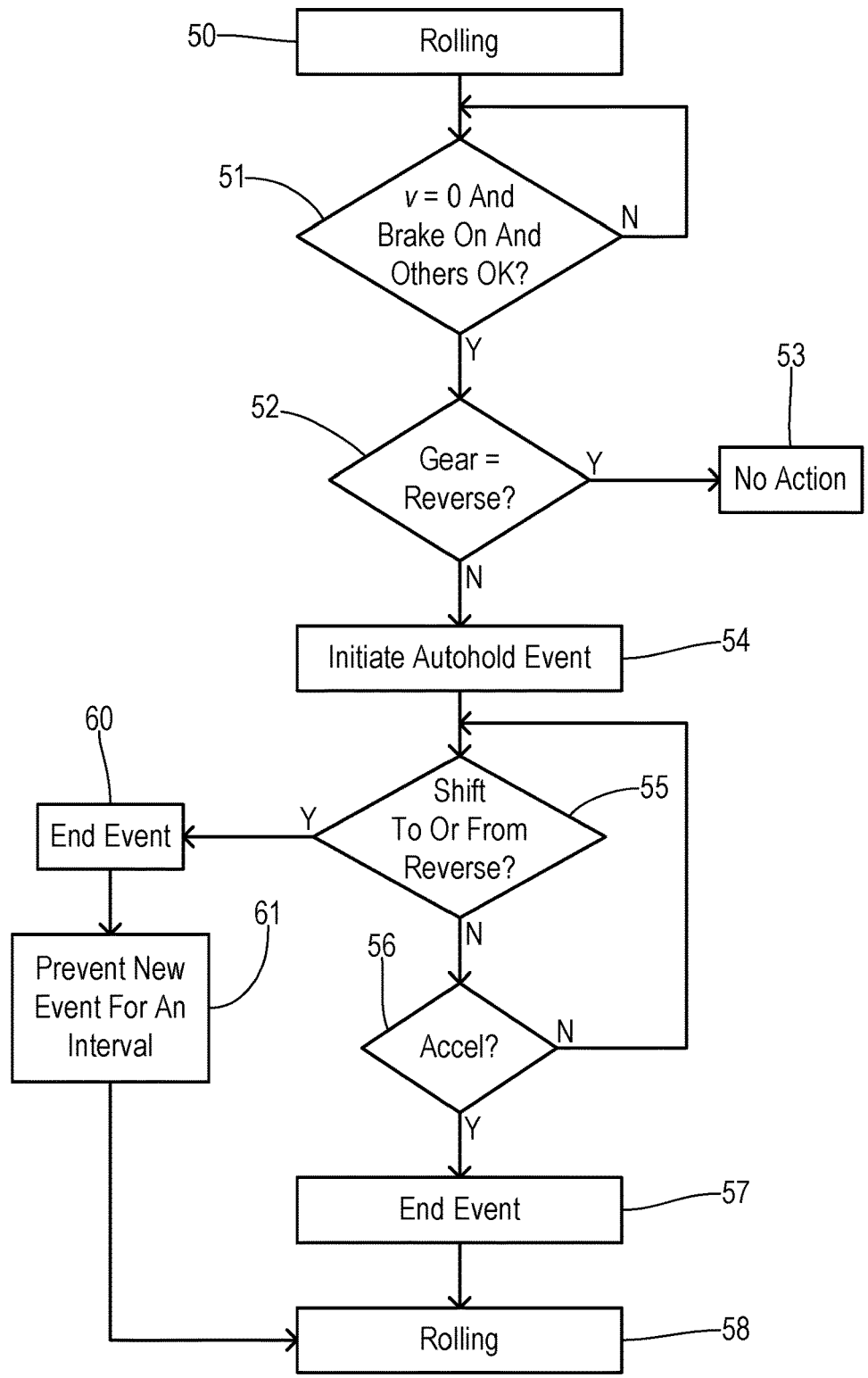
FIG. 4 is a flowchart showing one preferred method of the invention.

A preferred method of the invention shown in FIG. 4 begins with the vehicle rolling in step 50. In step 51, periodic checks are made to determine whether 1) the vehicle has been braked to a stop with the brake pedal depressed and 2) any other required conditions are satisfied (such as the driver wearing a seatbelt and the driver door being closed). Once these conditions are true and the driver stops depressing the brake pedal, a check is performed in step 52 to determine whether the gear shift position is the Reverse position. If in Reverse, then no action is taken at step 53 and the process ends.

If the gear shift position is not Reverse, then an autohold event is initiated in step 54. As an alternative to checking for the Reverse position, step 52 could check whether the gear shift position is in a forward or Neutral position, with the method proceeding to step 54 only if the forward (e.g., Drive or Low) position or Neutral position are detected. In the autohold event, brake torque may be automatically maintained either hydraulically or electrically, and other conditions (such as reaching a maximum allowed time duration for an autohold event) may cause an autohold event to terminate as known in the art.

While the autohold event is in progress, a check is performed in step 55 to determine whether the gear shift position goes into or out of Reverse position. While the gear position continues to stay in Drive, Low, or Neutral, a check is performed in step 56 to determine whether the accelerator pedal has been activated. If the accelerator pedal has not been activated, then the checks of steps 55 and 56 are continually repeated. Once the accelerator pedal has been activated, then the brake autohold event ends in step 57 with the brake torque being released and the vehicle reentering the rolling state at step 58. The release of the brake torque may follow a controlled release that has a calibratable slope. The slope or trajectory of the releasing torque may be fixed or may be variably controlled in response to an uphill or downhill orientation of the vehicle, the forward or reverse position of the gear selector, the detected proximity of nearby objects, or other sensed conditions.

If the transmission gear shift position moves to or from Reverse in step 55, then the autohold event in progress is terminated in step 60 with the brake torque being released. In the event that the shift position moved from Reverse to a forward or neutral gear position, it is desirable to maintain the autohold cancellation for a duration sufficient to allow completion of the low-speed maneuver, but to then re-enable the autohold feature after a predetermined interval so that cancellation of the feature does not last longer than the low-speed maneuvers. Therefore, in step 61 measures are taken to prevent initiating a new autohold event for only a predetermined interval, which may be comprised of a predetermined period of time or the detection of the vehicle speed rising above a predetermined speed threshold indicative of low-speed maneuvers. For the predetermined time delay, a delay of about 30 seconds may be used. When a predetermined speed is used, a speed threshold may be set at about ten miles per hour, for example.

Figure 5:
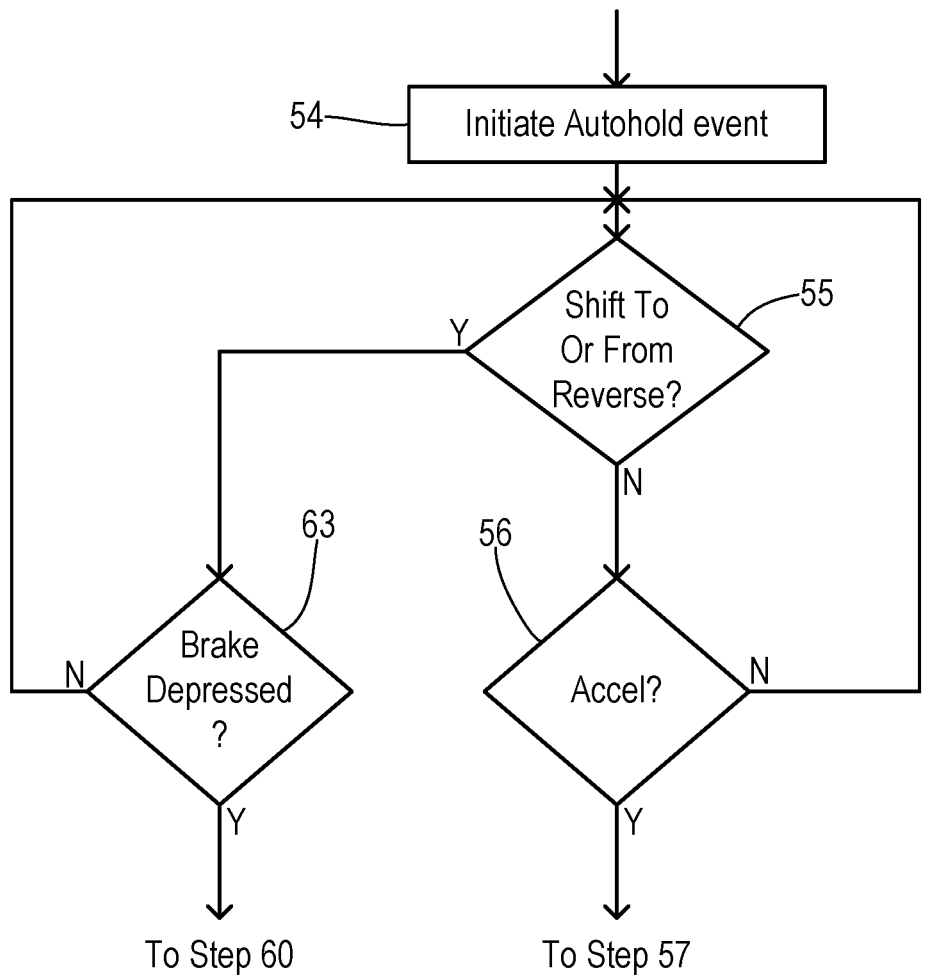
FIG. 5 is a flowchart showing another embodiment of a preferred method.

Some vehicles may permit the transmission to be shifted from a forward gear (e.g., Drive or Low) into Reverse without requiring the brake pedal to be pressed. If an AutoHold event is in progress when such a shift into Reverse is being made and the brake is not pressed, then an unintended brake release could potentially result from ending the AutoHold event in step 60. This possibility can be addressed by preventing a shift into Reverse when in an AutoHold event unless the brake is pressed. Alternatively, the method can be adjusted as shown in FIG. 5 so that a pending AutoHold event is not terminated under these conditions. Thus, when a shift to or from Reverse is detected in step 55, a check is performed in step 63 to determine whether the brake pedal is pressed by the driver. If not, then a return is made to step 55 in order to monitor for another shift event in step 55 or the pressing of the accelerator pedal in step 56 (i.e., the current AutoHold event is not canceled). If the brake is pressed in step 63 then the method proceeds to step 60 and the AutoHold event ends so that the low speed maneuvering is facilitated.

What is claimed is:
1. A vehicle comprising:
an autohold selector;
a gear selector including forward and reverse gear positions;
a brake pedal;
a brake actuator;
a control circuit configured to initiate a brake hold event of the brake actuator in response to predetermined conditions including the autohold selector being on and the vehicle braking to a stop with the brake pedal depressed, wherein initiating the brake hold event is prevented if the gear selector is in the reverse position, and wherein the control circuit prevents initiation of a brake hold event for a predetermined interval when the gear selector shifts from the reverse position to the forward gear position or the neutral position.

2. The vehicle of claim 1 wherein the predetermined interval is comprised of a predetermined time delay.

3. The vehicle of claim 1 wherein the predetermined interval terminates when the vehicle moves at a speed greater than a predetermined speed.

4. A method of automatic brake hold for a vehicle comprising:
   manually selecting an autohold state;
   detecting driver actuation of a brake pedal;
   detecting a speed of the vehicle;
   detecting a position of a gear selector movable to forward and reverse positions;
   initiating a brake hold event when the autohold state is selected and the vehicle speed drops to zero with the brake pedal being actuated, unless the gear selector is in the reverse position; and
   preventing initiation of a brake hold event for a predetermined interval when the gear selector shifts from the reverse position to the forward gear position or the neutral position;
   wherein a brake hold event in progress is terminated if the gear selector shifts into the reverse position while the brake pedal is pressed, and wherein the brake hold event in progress is continued if the gear selector shifts into the reverse position while the brake pedal is not pressed.

5. The method of claim 4 wherein the predetermined interval is comprised to of a predetermined time delay.

6. The method of claim 4 wherein the predetermined interval terminates when the vehicle moves at a speed greater than a predetermined speed.

\* \* \* \* \*